(12) United States Patent
Kiilerich

(10) Patent No.: US 7,669,121 B2
(45) Date of Patent: Feb. 23, 2010

(54) TRANSCODE MATRIX

(75) Inventor: Dennis A Kiilerich, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 932 days.

(21) Appl. No.: 11/039,252

(22) Filed: Jan. 19, 2005

(65) Prior Publication Data

US 2006/0161538 A1 Jul. 20, 2006

(51) Int. Cl.
*G06F 17/00* (2006.01)
(52) U.S. Cl. ........................ 715/249; 715/273
(58) Field of Classification Search ................ 715/249, 715/202, 200, 273
See application file for complete search history.

(56) References Cited

U.S. PATENT DOCUMENTS

| | | | |
|---|---|---|---|
| 5,893,920 A | | 4/1999 | Shaheen et al. |
| 5,987,126 A | | 11/1999 | Okuyama et al. |
| 6,052,735 A | | 4/2000 | Ulrich et al. |
| 6,189,146 B1 | | 2/2001 | Misra et al. |
| 6,219,652 B1 | | 4/2001 | Carter et al. |
| 6,324,544 B1 | | 11/2001 | Alam et al. |
| 6,327,652 B1 | | 12/2001 | England et al. |
| 6,393,434 B1 | | 5/2002 | Huang et al. |
| 6,407,680 B1 * | | 6/2002 | Lai et al. ................. 341/50 |
| 6,463,445 B1 | | 10/2002 | Suzuki et al. |
| 6,493,758 B1 | | 12/2002 | McLain |
| 6,542,546 B1 * | | 4/2003 | Vetro et al. ............ 375/240.12 |
| 6,611,358 B1 * | | 8/2003 | Narayanaswamy ......... 358/442 |
| 6,757,517 B2 | | 6/2004 | Chang |
| 6,772,340 B1 | | 8/2004 | Peinado et al. |
| 6,775,655 B1 | | 8/2004 | Peinado et al. |
| 6,959,348 B1 * | | 10/2005 | Chan et al. .................. 710/65 |

(Continued)

FOREIGN PATENT DOCUMENTS

WO WO02/28006 4/2002

(Continued)

OTHER PUBLICATIONS

"Transcode" Online Nov. 29, 2002 retrieved from the internet: url:http://www.theorie.physik.uni-goettingen.de/{ostreich/transcode/html/intro.html retrieved Aug. 19, 2004.

(Continued)

*Primary Examiner*—Stephen S Hong
*Assistant Examiner*—Manglesh M Patel
(74) *Attorney, Agent, or Firm*—Lee & Hayes, PLLC

(57) ABSTRACT

A transcode architecture determines if a media source file needs to be transcoded for playback on a target playback device, and if so, the proper format needed for transcoding the source file. A transcode architecture includes a transcode manager, a transcode matrix, a transcode engine and a cache for storing transcoded media files. A media library stores media source files and device capabilities information. The transcode manager controls a transcode process in which the transcode matrix generates a profile for a media source file and accesses device capabilities that indicate playback capabilities for a target playback device. The transcode matrix compares parameters of the source profile with the device capabilities to decide whether the source file must be transcoded to enable playback of the file on the target playback device, and if so, the proper format needed for transcoding the source file.

20 Claims, 8 Drawing Sheets

U.S. PATENT DOCUMENTS

| | | | |
|---|---|---|---|
| 6,981,045 B1* | 12/2005 | Brooks | 709/226 |
| 6,983,371 B1 | 1/2006 | Hurtado et al. | |
| 7,039,643 B2* | 5/2006 | Sena et al. | 707/101 |
| 7,054,335 B2* | 5/2006 | Wee et al. | 370/486 |
| 7,054,964 B2* | 5/2006 | Chan et al. | 710/65 |
| 7,089,309 B2* | 8/2006 | Ramaley et al. | 709/226 |
| 7,111,058 B1* | 9/2006 | Nguyen et al. | 709/224 |
| 7,120,873 B2 | 10/2006 | Li | |
| 7,133,925 B2* | 11/2006 | Mukherjee et al. | 709/231 |
| 7,143,354 B2 | 11/2006 | Li et al. | |
| 7,155,475 B2 | 12/2006 | Agnoli et al. | |
| 7,200,680 B2* | 4/2007 | Evans et al. | 709/246 |
| 7,203,620 B2 | 4/2007 | Li | |
| 7,382,879 B1 | 6/2008 | Miller | |
| 7,421,024 B2* | 9/2008 | Castillo | 375/240.18 |
| 7,433,546 B2 | 10/2008 | Marriott et al. | |
| 7,475,106 B2* | 1/2009 | Agnoli et al. | 709/201 |
| 2001/0033619 A1 | 10/2001 | Hanamura et al. | |
| 2002/0078075 A1 | 6/2002 | Colson et al. | |
| 2003/0028488 A1 | 2/2003 | Mohammed et al. | |
| 2003/0028643 A1 | 2/2003 | Jabri | |
| 2003/0126608 A1 | 7/2003 | Safadi et al. | |
| 2004/0193648 A1 | 9/2004 | Lai et al. | |
| 2004/0196975 A1 | 10/2004 | Zhu et al. | |
| 2005/0239434 A1* | 10/2005 | Marlowe | 455/345 |
| 2006/0008256 A1 | 1/2006 | Khedouri et al. | |
| 2007/0058718 A1* | 3/2007 | Shen et al. | 375/240.12 |
| 2007/0153910 A1* | 7/2007 | Levett | 375/240.25 |

FOREIGN PATENT DOCUMENTS

| | | |
|---|---|---|
| WO | WO03/034313 | 4/2003 |
| WO | WO03/058508 | 7/2003 |
| WO | WO2004/102459 | 11/2004 |

OTHER PUBLICATIONS

"SoX—Sound eXchange" Internet Dec. 12, 2003 retrieved from url:http://web.archive.org/web/20031212170807/http://sox.sourceforge.net retrieved on Aug. 16, 2004.

"Transcoding: Extending e-buisness to new environments" Internet Nov. 6, 2002 Retrieved from URL:http://researchweb.watson.ibm.com/journal/sj/401/britton.html retrieved Aug. 19, 2004.

Britton, "Transcoding: Extending E-Business to New Environments"; IBM Systems Journal, 2001, vol. 40, No. 1; pp. 153-178.

Chandra, et. al., "Application-Level Differentiated Multimedia Web Services Using Quality Aware Transcoding"; IEEE Journal on Selected Areas of Communications, Dec. 2000; vol. 18, No. 12; pp. 2544-2564.

"An Adaptive Web Content Delivery System" Internet May 21, 2000 Retrieved from the Internet URL:http://research.microsoft.com/asia/dload_files/g-mcomputing/MediaCom2/v5.pdf retrieved Aug. 20, 2004.

Chen, et al, "Mobile EE—an Interprise Mobile Service Platform"; Wireless Networks, 2003; vol. 9, No. 4; pp. 283-297.

Pervasive WEb Content Delivery with Efficient Data Reuse' Internet Aug. 1, 2002 retrieved from url:http//2002.iwcw.org/papers/18500120.pdf retrieved on Aug. 16, 2004.

"The Multitasking Mindset Meets the Operating System" EDN Electrical Design News Cahners Publishing Co. Newton Massachusetts vol. 35 No. 20 Oct. 1, 1990.

Digital 5, "Media Server," printed Apr. 18, 2005, 2 pages.

DRM Watch Staff, "Microsoft Extends Windows Media DRM to Non-Windows Devices," DRM Watch, May 7, 2004, 2 pages.

Huang, et al., "A Frame-Based MPEG Characteristics Extraction Tool and Its Application in Video Transcoding"; IEEE Transaction on Consumer Electronics, Aug. 2002; vol. 48, No. 3; pp. 522-532.

Ihde, Steven C. et al., "Intermediary-based Transcoding Framework," printed Apr. 18, 2005, pp. 1-3.

Kassler et al., "Generic QOS Aware Media Stream Transcoding and Adaptation," Dept. of Distributed Systems, University of Ulm, Germany, printed Apr. 18, 2005, 10 pages.

Lee, Yui-Wah et al., "Gamma: A Content-Adaptation Server for Wireless Multimedia Applications," Bell Laboratories, Holmdel, NJ USA, printed Apr. 18, 2005, pp. 1-36.

Lee, et al., "Data Synchronization Protocol in Mobile Computing Environment Using SyncML"; HSNMC 2002 5th IEEE International Conference on High Speed Networks and Multimedia Communications, 2002; pp. 133-137.

LightSurf Technologies, "LightSurf Intelligent Media Optimization and Transcoding," printed Apr. 18, 2005, 1 page.

Nikkei Electronics, "Contents Transcoding Technology is Now Spotlighted as 'Lubricant' for Online Digital Distribution"; vol. 775, 2000, pp. 57-62.

"Multimedia Content Adaptation for QoS Management over Heterogeneous Networks" Internet May 11, 2001 retrieved Aug. 18, 2004.

"Caching Strategies in Transcoding-enabled Proxy Systems for Streaming Media Distribution Networks" Internet Dec. 10, 2003 Retrieved from URL:http://www.hpl.hp.com/techreports/2003/HPL-2003-261.pdf retrieved on Aug. 19, 2004.

Singh, "PTC: Proxies that Transcode and Cache in Heterogeneous Web Client Environments"; Proceedings of the Third International Conference on Web Information Systems, 2002; pp. 11-20.

"Context -based media Adaptation in Pervasive Computing" Internet May 31, 2001 Retrieved from url:http://www.mcrlab.uottawa.ca/papers/Ryan_paper.pdf retrieved on Aug. 19, 2004.

* cited by examiner

TRANSCODE MATRIX

TECHNICAL FIELD

The present disclosure generally relates to synchronizing media content between a source device and a target playback device, and more particularly to determining a format for transcoding the media content if transcoding the media content is necessary for playback on the target device.

BACKGROUND

As digital media technology continues to advance and the cost of storage continues to decline, users increasingly host and consume digital media on their own primary computers (e.g., desktop PCs). Examples of such digital media include music, video, still pictures, and so on.

In addition, a corresponding increase in the availability of portable media playback devices such as personal digital assistants (PDAs), hand-held computers, laptop computers, and smart phones is providing users more ubiquitous access to information than ever. As users rely more and more on such portable devices, there is a growing need for applications that effectively transfer digital media from source devices, such as primary computers, to the portable playback devices.

Transcoding is a way of altering a media file through one or more transcoding processes so the file can be played back on a particular playback device. Thus, transcoding converts a source media file having certain characteristics into a target media file having different characteristics. Such transcoding processes can include, for example, converting a media file from one format to another (e.g., MP3 to WMA), changing the codec of the file, down-sampling the file to a lower bit rate to reduce the amount of storage space needed on the playback device, adapting the screen size of the file (i.e., height/width) so video appears correctly on the playback device, and so on.

Deciding whether a source media file needs to be transcoded for playback on a particular target playback device and what format to transcode the source file to based on the target playback device's capabilities are important steps in the transcoding process. That is, a source media file on a source device may be formatted correctly for playback on one target playback device, but may need to have one or more parameters reformatted before it can be played back on a different target playback device. There is a continual need to improve the transcoding process through such decision steps in order to ensure that source files are properly and timely transcoded for transfer and playback on different target playback devices.

SUMMARY

A system and methods are described for determining if a media source file needs to be transcoded for playback on a target playback device and, if so, the proper format needed for transcoding the source file. The source file can then be transcoded and transferred to the target playback device.

In a described embodiment, a system provides a transcode architecture that includes a transcode manager, a transcode matrix, a transcode engine and a cache for storing transcoded media files. The system also includes a media library to store media source files and device capabilities information. In the described embodiment, the transcode manager controls a transcode process in which the transcode matrix generates a profile for a media source file and accesses device capabilities that indicate playback capabilities for a target playback device. The transcode matrix compares parameters of the source profile with the device capabilities to decide whether the source file must be transcoded to enable playback of the file on the target playback device. If the source file needs to be transcoded, the transcode matrix generates a target profile containing target parameters determined to match, and/or fall within acceptable ranges of, corresponding parameters indicated in the device capabilities. The transcode matrix hands off the target profile to the transcode engine, which transcodes the source file according to the target profile. The transcoded source file is then saved in a memory and can be transferred to the target playback device at an appropriate time, such as when the target playback device is connected to the source device during a synchronization process.

BRIEF DESCRIPTION OF THE DRAWINGS

The same reference numerals are used throughout the drawings to reference like components and features.

DETAILED DESCRIPTION

Introduction

The following discussion is directed to a system and methods for determining whether a media source file needs to be transcoded to enable playback of the file on a target playback device, and the manner in which such transcoding will be implemented with respect to various parameters of the source file. The system and methods described herein for determining the transcoding requirements of a source media file to play back on a target playback device, facilitate and improve transcoding in general, regardless of whether the transcoding is performed before or during transferring/synchronizing of the media file to the target playback device.

Exemplary Environment

Figure 1:
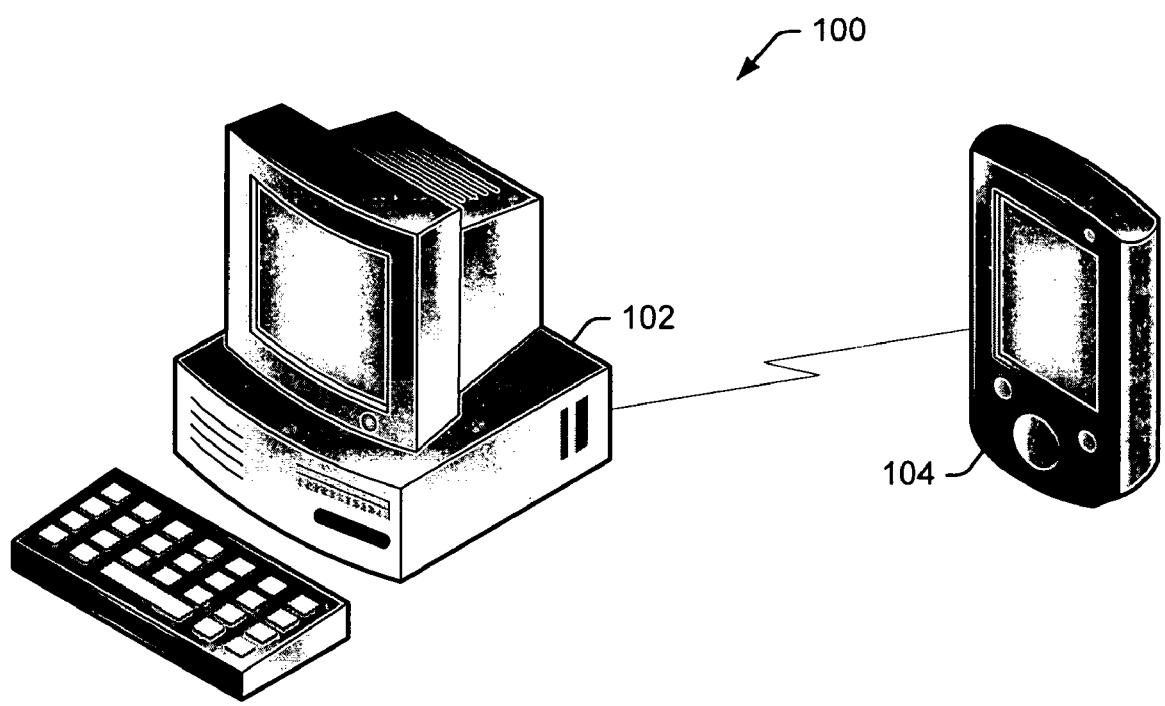
FIG. 1 illustrates an exemplary environment suitable for determining if a media source file needs to be transcoded for playback on a target playback device and, if so, the proper format needed for transcoding the source file.

FIG. 1 illustrates an exemplary environment 100 suitable for determining whether a digital media source file needs to be transcoded and what format the file should be transcoded to if needed. The exemplary environment 100 generally illustrates a media content synchronization scenario in which a target playback device 104 is coupled to a source device 102 for the purpose of transferring pre-transcoded media content from the source device to the target device. In a typical scenario, media content received by source device 102 and destined for synchronization with a target playback device 104 is fully transcoded prior to the time the target device 104 is connected to the source device. Thus, copying media content from the source device 102 to the target playback device 104 is uninhibited by the transcoding process, and the time for synchronizing/copying the content is significantly reduced.

It is noted that the hardwire coupling between the source device 102 and target playback device 104 as shown in the exemplary environment 100 of FIG. 1 is intended by way of example only, and not by way of limitation, to illustrate one manner of facilitating content synchronization/transfer from source device 102 to target playback device 104. Various other known methods for coupling the target playback device 104 for synchronization are also contemplated, including for example, coupling through a synchronization port that includes a docking cradle for the playback device 104, coupling through a wireless infrared port, coupling via a network using a wireless and/or modem/cellular-based Internet and VPN (virtual private network), and so on. Thus, physical coupling of target playback device 104 to source device 102 for content synchronization is not necessary.

Figure 8:
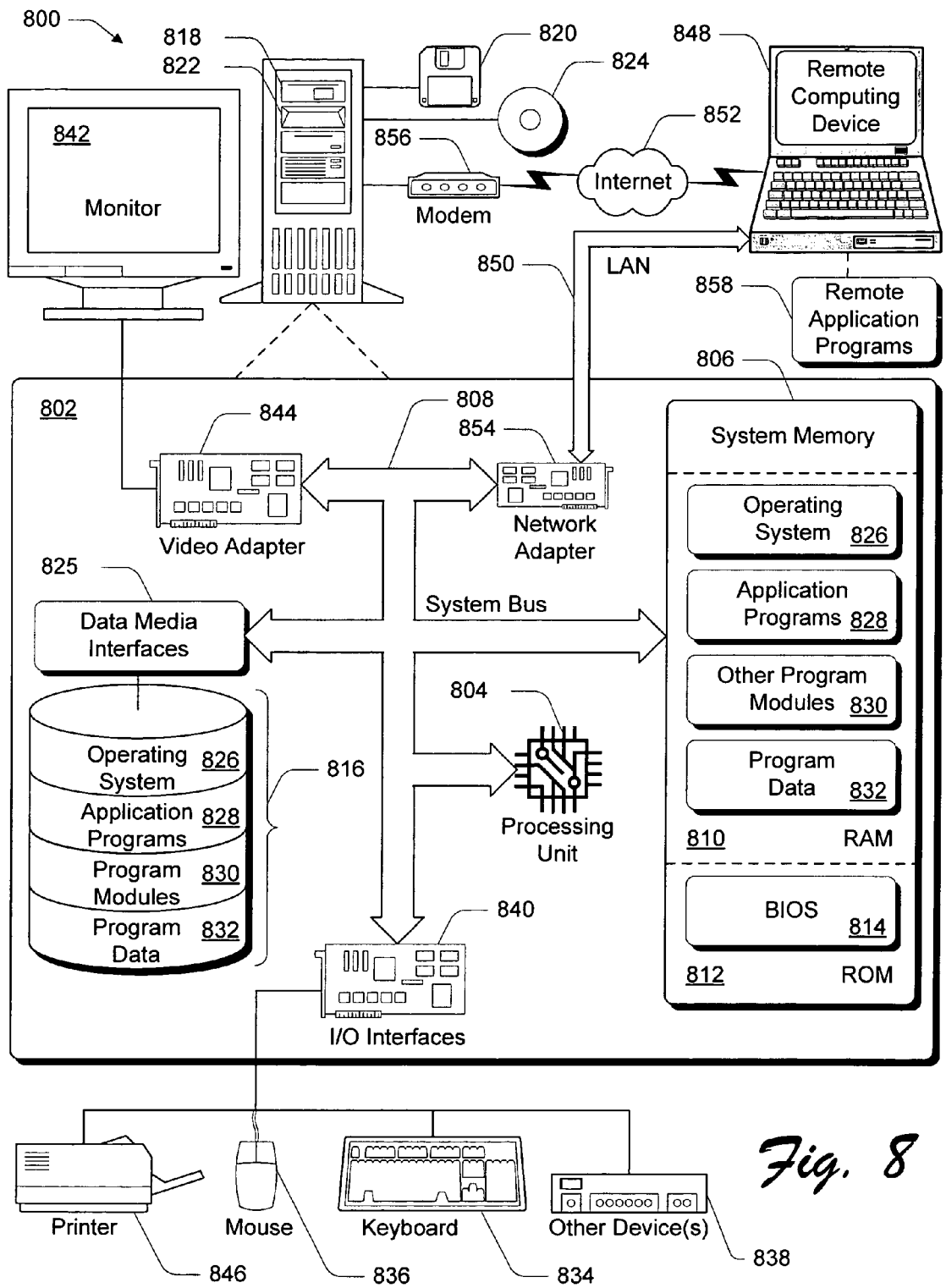
FIG. 8 illustrates an exemplary computing environment suitable for implementing a source computing device such as discussed with reference to FIGS. 1 through 4.

Source computing device 102 is typically implemented as a user's primary computing device, such as a desktop personal computer (PC). However, source device 102 might also be implemented as various other conventional computing devices generally configured to receive and render multimedia content from various sources, and/or to reformat such content for synchronization and playback on a target playback device 104. An example of a source computing device 102 is depicted in FIG. 8 and described in greater detail below in the Exemplary Computing Environment section.

Target media playback device 104 may be implemented as any one of numerous digital media player devices available from various manufacturers, a general computing device such as a desktop PC, or any other suitable media playback device. Such devices are typically configured with audio and/or video subsystems capable of rendering digital media (audio/video) files such as MP3 (MPEG-1 Audio Layer 3) files, .WAV (Windows® Wave) files, .WMA (Windows® Media Audio) files, .WMV (Windows® Media Video) files, MPEG (Moving Picture Experts Group) files, .jpg files, .gif files, and the like. Accordingly, by way of example and not limitation, a target media playback device 104 may include various general-purpose laptop and notebook computers configured to playback media content, in addition to devices that are more specifically designed to play back various forms of multimedia, such as Rio's Rio Riot and Rio Karma, Archos' Jukebox Recorder 20 and AV320 Pocket Audio/Video Recorder, Creative's Jukebox Zen and Portable Media Center Zen, Apple's iPod, ZVUE's MP4 Video Player, and so on.

EXEMPLARY ENVIRONMENT

Figure 2:
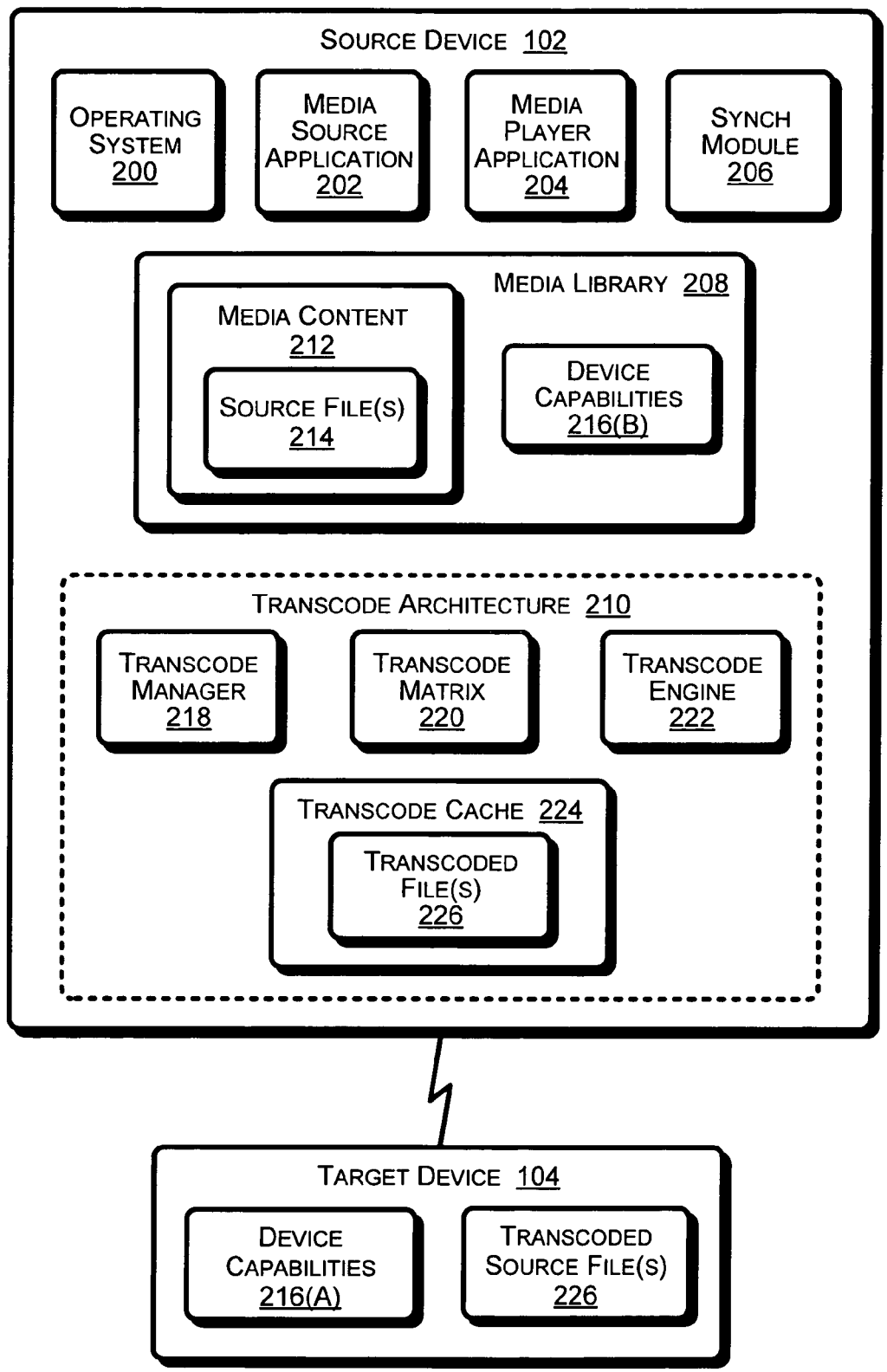
FIG. 2 illustrates a block diagram representation of an exemplary source device that is suitable for determining if a media source file needs to be transcoded for playback on a target playback device and, if so, the proper format needed for transcoding the source file.

FIG. 2 illustrates a block diagram representation of an exemplary source device 102 that is suitable for determining whether a media source file needs to be transcoded for playback on a target playback device, and the manner in which various parameters of the source file should be transcoded if necessary. Various components of source device 102 facilitate the retrieval and management of media content for the general purpose of rendering the content on source device 102 and/or synchronizing the content with target playback device 104. These components include an operating system 200, one or more media source applications 202, a media player application 204, a media content synchronization program module 206, a media library 208, and a transcode architecture 210 embodied on one or more processor-readable media (see FIG. 8 and Exemplary Computing Environment section below). Although these components are illustrated separately on source device 102, it is noted that any one or more of these components may be implemented on source device 102 as part of a multimedia software product, the operating system 200, or as stand-alone components.

A media source application 202 may be one or more of various applications and/or tools configured to receive media content. For example, media source application 202 may be an interactive TV service application that facilitates the recording of video (e.g., TV programming) directly off of a cable and/or satellite feed, a video capture component to transfer home video footage from a digital video recorder onto source device 102, a Web browser application that facilitates downloading media off the Internet, and so on. Such media source applications 202 typically supply various forms of media content 212 to media library 208 on source device 102. Thus, source files 214 within media content 212 stored in media library 208 may include, for example, audio files in the form of MP3 and WMA files, video files in the form of DVR-MS, AVI and MOV files, image files in the form of GIF and JPEG files, and so on. Media library 208 additionally includes device capabilities 216(B) acquired from a target playback device 104 as discussed in greater detail herein below.

In addition to the configurations noted above, a media source application 202 may also include or be part of a media player application 204. A media player application 204 is typically a desktop based application player that manages a broad range of multimedia related tasks. For example, a media player application 204 may handle streaming audio and video, CD/DVD playback, MP3 and WMA support, encoding, CD/DVD burning, Internet radio, and the like. A media player application 204 may also offer Web browser integration so it can be embedded in a browser enabling multi-tasking during streaming video. Like other media source applications 202, a media player application 204 may supply various forms of media content 212 (i.e., source files 214 as audio files, video files, image files, etc.) to a media library 208 on source device 102.

Synch module 206 may be configured as part of a media player application 204, the operating system 200, or as a stand-alone component, and provides a user-configurable model for facilitating the transfer of media source files 214 to a target playback device 104 from the media library 208 on source device 102. As noted above, examples of media content 212 stored in media library 208 may include source files 214 in the form of audio, video, text, or image files. Media content 212 may also include a static or automated playlist of files (e.g., audio, video, and images) or any grouping of files or data. Some source files 214 in the media library 208 may be more or less important to a user than others, and the synch module 206 may assign a transfer priority to files in the library to indicate their relative importance or desirability as indicated by the user.

Components of transcode architecture 210 interact with synch module 206 and other components of source device 102 to facilitate transcoding of source files 214 (i.e., media content 212). The transcoding of source files 214 is preferably performed as a background process on source device 102 in anticipation of a synchronization process that transfers media content to a target device 104 when the target device 104 is coupled to the source device 102. However, transcoding may also be performed concurrently with such a synchronization process during the transfer of media content to a target device 104.

Transcoding is generally managed by the transcode architecture 210, which includes transcode manager 216, a transcode matrix 220, transcode engine 222, and a transcode cache 224 for storing transcoded media content (i.e., transcoded source files 226). Transcode manager 218 retrieves device capabilities 216(A) from a target device 104 (e.g., by querying the target device) upon an initial coupling of the target device 104 with source device 102. Device capabilities 216 are an object or report from the target device 104 regarding what types of media content the device can play back successfully. A device capabilities 216 object or report contains a list of profile collections keyed by a format code. The format code is an indicator of content format loosely based on the extension of the file. A profile collection is a collection of profiles all having the same format code. A profile, in general, represents a type of file, either as source content or as content that a target device can play. Therefore, source profiles and device profiles are discussed throughout this disclosure. A profile includes codec information, and various content parameters such as bitrates, sample rates, number of channels, and so on. The parameter values in a profile are keyed by parameter name and they can be enumerated, ranged, or unrestricted.

Once device capabilities 216(A) are retrieved by transcode manager 218, they may be serialized into XML format and saved as device capabilities 216(B) in the media library 208 in a row that represents that particular target device 104. In addition, each component of the device capabilities 216 (i.e., including the profile collection, device profiles, and parameter values) may be serialized by itself, resulting in a combined XML. Sample device capabilities and sample serialized device capabilities are shown below in the Appendix section of this disclosure. The samples in the Appendix provide examples of device capabilities for a particular target playback device 104 and examples of what serialized device capabilities may look like.

The transcode manager 218 caches device capabilities 216(B) in media library 208 so that they are accessible by transcode matrix 220 and other applications. In general, caching device capabilities 216(B) enables the transcode architecture 210 to perform background transcoding of newly acquired media source files 214 (e.g., video/TV files, audio files) that match a target playback device's synchronization rules, even when the target device is not coupled to source device 102. This minimizes the delay incurred at transfer time since source files 214 can be transcoded ahead of time. Transcode manager 218 monitors the media content 212 in the media library 208 for newly acquired media source files 214. When a media source file 214 is stored in the media library 208 (e.g., by a media source application 202, media player application 204, etc.), the transcode manager 218 determines if the media source file 214 is destined to be transferred to a target device 104. If so, the transcode manager 218 hands the source file path (i.e., location of source file within media library 208) to the transcode matrix 220 and asks the transcode matrix 220 to determine whether the media source file 214 needs to be transcoded for playback on the target playback device 104, and if so, how the source file 214 should be transcoded.

In order to determine if a media source file 214 needs to be transcoded for a particular target playback device 104, the transcode matrix 220 first generates a source profile for the source file 214 that catalogues source file information such as the source file codec, parameters and their values, and so on. For an audio source file 214, the parameters in the source profile typically include an audio bitrate, a sample rate, the number of channels, the audio bit depth, and the audio codec (e.g., WAVE codec). For a video source file 214, the parameters in the source profile typically include a video bitrate, a height, a width, a frame rate, and the video codec (e.g., FOURCC codec). The transcode matrix 220 searches for the parameters of the source file 214 in the media library, according to the file path provided by transcode manager 218. If this search fails, the transcode matrix 220 inspects the source file itself, for example, by opening the source file using a file format SDK to gain access to the source file parameters. If this also fails, the transcode matrix 220 will assign an artificial profile to the source file 214. After accessing the source file parameters, the transcode matrix 220 generates the source profile for the source file. The transcode matrix 220 can then use the source profile for comparison with the device capabilities 216(B) of a target playback device as discussed below with reference to FIG. 3.

Figure 3:
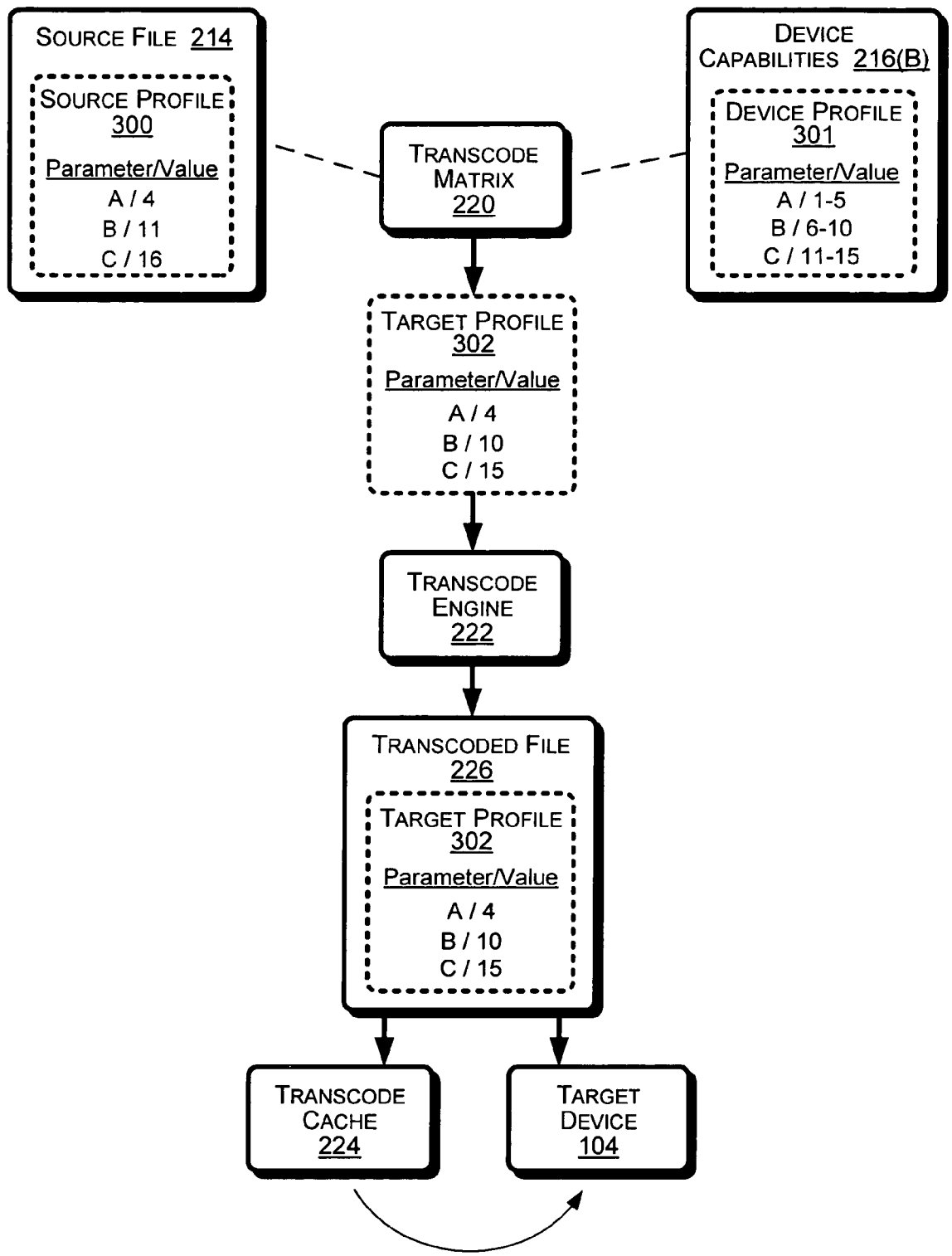
FIG. 3 illustrates a block diagram representation of an exemplary process for comparing a source profile with the device capabilities of a target playback device to determine if a source file needs to be transcoded, and how various parameters of the source file should be transcoded if necessary.

FIG. 3 illustrates a block diagram representation of an exemplary process for comparing a source profile 300 with the device capabilities 216(B) of a target playback device 104 in order to determine if a source file 214 needs to be transcoded, and how various parameters of the source file should be transcoded if necessary. In FIG. 3, a source file 214 is shown with its corresponding source profile 300 generated by transcode matrix 220 as discussed above. It is noted that source profile 300 is illustrated in FIG. 3 as a part of source file 214 only for the purpose of this discussion, to indicate that a source profile 300 is an inherent part of a source file 214. However, after its generation by transcode matrix 220, as discussed above, a source profile 300 may actually be stored in media library 208 or in some other memory on source device 102.

There are several steps the transcode matrix 220 takes to determine if a source file 214 needs to be transcoded. The first is selecting a profile collection in the device capabilities 216(B) that matches the format code of the source profile 300. As noted above, a profile collection is a collection of device profiles that all have the same format code. The format code is an indicator of file content format that is loosely based on the file extension. For example, a format code for a WMA file will be selected from the device capabilities 216(B) (assuming it exists in the device capabilities 216(B)) if the source profile 300 is associated with a WMA source file. If a profile collection is not found in the device capabilities 216(B) that matches the format code of the source profile 300, then the source profile 300 is not supported, and the source file 214 is not playable on the target playback device 104. Therefore, no transcode of the source file 214 would be necessary.

In the case where a profile collection is found in the device capabilities 216(B) that does not contain any device profiles 301, then the format code is supported with no restrictions, and the source file 214 also does not need to be transcoded. In this case, however, where a target device 104 does not specify any restrictions in its device capabilities 216(B), artificial restrictions will be imposed while the device capabilities are being retrieved. For example, a 32-160 kbps (kilobits per second) bitrate and 0-44100 KHz sample rate may be imposed on the target device 104.

In the case where a profile collection is found in the device capabilities 216(B) that contains one or more device profiles 301, then the transcode matrix 220 determines if the source file 214 needs to be transcoded by checking each device profile 301 to see if it matches the source profile 300. Matching is done by comparing each parameter in the source profile 300 with the corresponding parameter found in the device profile 301 of the device capabilities 216(B). FIG. 3 shows the transcode matrix 220 making comparisons between example parameter values in a source profile 300 and corresponding parameter values in the device profile 301 of device capabilities 216(B) (i.e., parameters A, B, and C). If a source profile parameter matches an enumerated value of the corresponding parameter in the device profile 301 of the device capabilities 216(B), or if it falls into the range specified by the same parameter in the device profile 301, then there is a match. If all parameters match between the source profile 300 and the device profile 301, then the transcode matrix 220 determines that the target device 104 supports the source profile 300. In this case, the transcode matrix 220 again concludes that there is no need to transcode the source file 214 because the source file 214 can be played back on the target device 104 in its current format.

However, if there are one or more parameters from the source profile 300 that do not match the corresponding parameters in the device profile 301 of the device capabilities 216(B), then the transcode matrix 220 determines that the source file 214 needs to be transcoded. As discussed in more detail below, there are other scenarios in which the transcode matrix 220 may also determine that a source file 214 needs to be transcoded, such as when a user specifies a preference or when a device has a total bitrate restriction.

As shown in FIG. 3, if the transcode matrix 220 determines that the source file 214 needs to be transcoded, it normalizes the source profile 300 by generating a target profile 302 based on the comparison of parameters between the source profile 300 and the device profile 301 of the device capabilities 216(B). In general, a profile containing ranged or enumerated parameters (e.g., from device capabilities 216 can be normalized to a profile that has unique parameters by achieving a closes parameter match. For each parameter, therefore, the transcode matrix 220 determines a target value for the target profile 302 by comparing each parameter from the source profile 300 with its corresponding parameter in the device profile 301. If a source profile 300 parameter value matches that of the device profile 301 (i.e., is the same as or within the same range as), then the transcode matrix 220 will set the target profile 302 parameter value to be the same as the source profile parameter value, which will be a single-valued enumeration containing this value. That is, if the source profile parameter and the device profile parameter match, the source profile parameter is not changed, but remains the same in the target profile 302. FIG. 3 provides an example of this with parameter A. The value of parameter A in the source profile 300 is 4, while the acceptable range for parameter A in the device profile 301 is 1-5. Therefore, because parameter A falls within the acceptable range in the device capabilities 216(B), the transcode matrix 220 sets the target value to 4 for parameter A in the target profile 302.

If a source profile 300 parameter value does not match that of the device profile 301 in the device capabilities 216(B) (i.e., is not the same as or within the same range as), then the transcode matrix 220 sets the target profile 302 parameter value to a value that is as close as possible to the source profile 300 parameter value while also being within the acceptable range for the device capabilities 216(B). Referring to the FIG. 3 example, parameter B of the source profile 300 is 11, while the acceptable range for parameter B in the device profile 301 of the device capabilities 216(B) is 6-10. As shown in the target profile 302, the transcode matrix 220 sets the target value for parameter B to 10, which is the closest possible value to the source profile value of parameter B, while still being within the acceptable device capabilities range for parameter B. The case is similar for parameter C shown in FIG. 3.

After generating the target profile 302, the transcode matrix 220 hands off the target profile 302 to the transcode engine 222. As shown in FIG. 3, the transcode engine 222 transcodes the source file 214 in accordance with target parameter values within the target profile 302. The transcode engine 222 generates a transcoded source file 304 whose parameters match those of the target profile 302. Therefore, the transcoded file 304 in FIG. 3 is illustrated as containing the target profile 302.

After the source file 214 is transcoded, the transcoded file 304 is typically stored on source device 102 in a transcode cache 224 and/or made available to target device 104 either directly or at some later time when the target device 104 is coupled to the source device 102, as shown in FIG. 3. The transcoded file is typically maintained in a memory on source device 102 in the event that the same format of the source file is suitable for another target device 104 at some later time.

Figure 4:
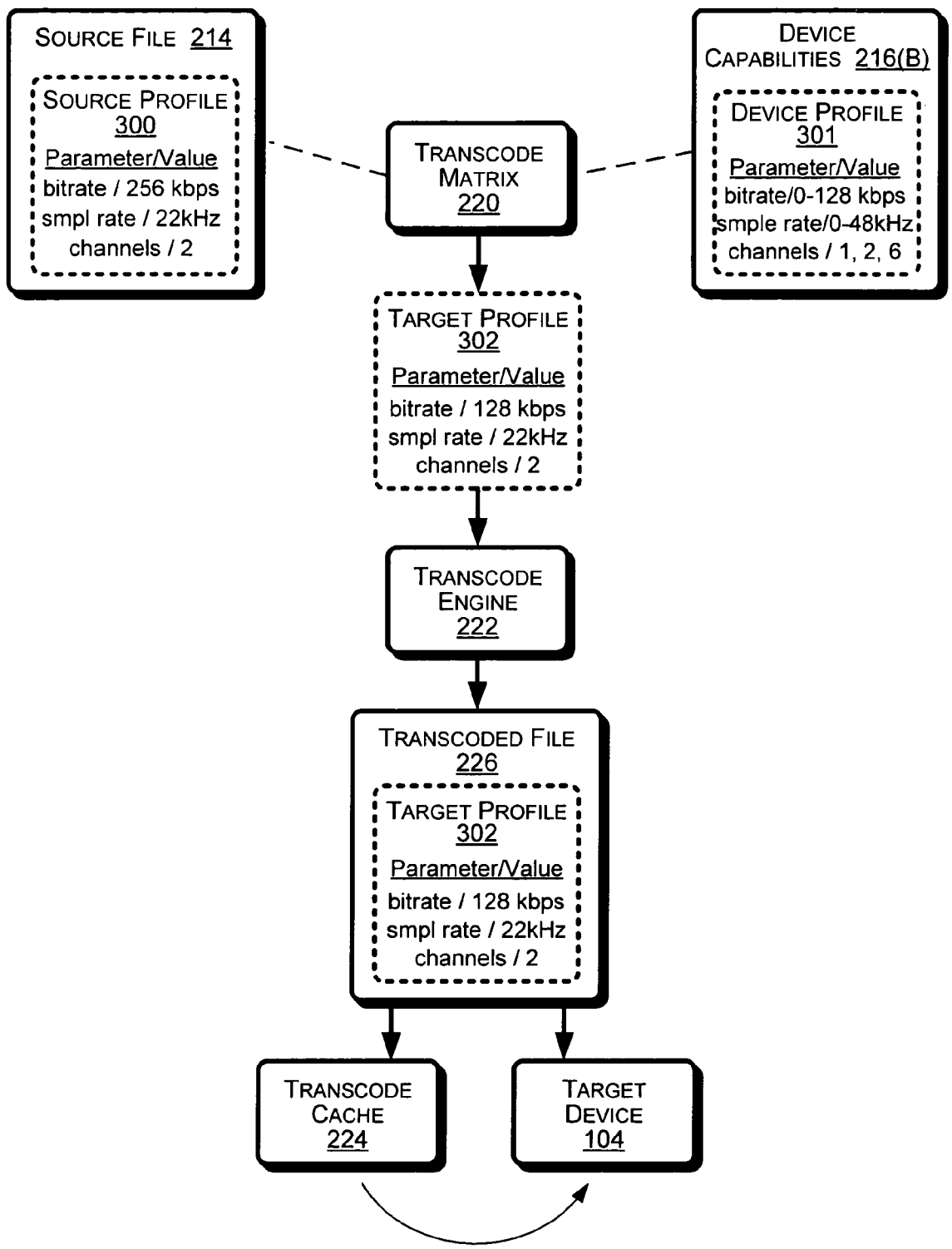
FIG. 4 illustrates a block diagram representation of an exemplary process as shown in FIG. 3 using exemplary parameters that illustrate how a transcode matrix determines target values for a target profile.

FIG. 4 shows the block diagram representation and exemplary process of FIG. 3 using several exemplary parameters that better illustrate how the transcode matrix 220 determines target values for the target profile 302 by comparing parameters from the source profile 300 with corresponding parameters in the device profile 301 of the device capabilities 216 (B). In the source profile 300 of FIG. 4, a bitrate parameter value is 256 kbps (kilobits per second) while the corresponding bitrate parameter in the device profile 301 indicates that the acceptable playback range for the device capabilities 216 (B) is between 0-128 kbps. The resulting target value for the bitrate parameter set by the transcode matrix 220 will be 128 kbps, as shown in the target profile 302 of FIG. 4. This is the closest value to the source profile value that is within the acceptable range of the device capabilities 216(B). A sample rate parameter value in the source profile 300 of FIG. 4 is 22 KHz. Because this value already falls within the acceptable range of the corresponding sample rate parameter value in the device capabilities 216(B) (i.e., 0-48 KHz), the transcode matrix 220 sets the target value for the sample rate parameter at 22 KHz. Likewise, the source profile 300 indicates that the source file 214 has 2 channels, while the device profile 301 of the device capabilities 216(B) show that acceptable (enumerated) values for the number of channels parameter are 1, 2, and 6. Because 2 channels is an enumerated value in the device profile 301, the transcode matrix 220 sets the target value for the number of channels parameter to 2.

Another step the transcode matrix performs following normalization as described above, is a "reduction" step. For example, there can be multiple candidate target profiles contending to be chosen, such as the following:

Source profile: 128 kbps, 44 kHz
Device capabilities:
Profile 1: (0-160 kbps, 0-48 kHz)
Profile 2: (96-320 kbps, 0-22 kHz)
Profile 3: (0-64 kbps, 0-96 kHz)
In this case, the device profiles will be normalized to:
Profile 1: 128 kbps, 44 kHz
Profile 2: 128 kbps, 22 kHz
Profile 3: 64 kbps, 44 kHz
Profile 1 is a better choice because the sample rate in profile 1 is closer to that of the source file.

The reduction process works by sorting the profiles by a single parameter at a time, and only retaining those profiles that are the best match. In the example above, if bitrate is the first parameter, then the 3rd profile will be eliminated because 128 kbps is a better match to the source bitrate than 64 kbps.

If the next parameter is sample rate, then the 2nd profile will be eliminated because profile 1 provides a better match.

However, in the case where neither profile matches the source exactly (as profile 1 does in the example above), then the lowest closest value takes precedence. That is, if the source parameter is 1000 and the choices on the target are 800, 900, 1050 and 1100, the order of preference would be 900, 800, 1050, 1100.

As noted briefly above, the transcode matrix 220 may determine that a source file 214 needs to be transcoded for reasons other than finding that one or more parameters from the source profile 300 do not match the corresponding parameters in the device capabilities 216(B). A user preference is one such reason where transcoding is required even if the target device 104 can support the source file 214 in its original format. If a user specifies a preference (i.e., an override) for a parameter (e.g., audio and/or video bitrate), the transcode matrix 220 will substitute the preferences into the source profile and effectively set the target value for that parameter in the target profile 302 to the preference specified by the user, or at least to a closest match to the user preference. During the determination of transcode need, the source file's audio and video bitrates, for example, are inspected and compared to the user-preferred bitrates specified for the device. If the source profile 300 shows that the source file 214 has a higher bitrate, then a transcode is needed. During the generation of the target profile 302, the transcode matrix 220 seeks a closest match to the user preference. This is done by modifying the source profile 300 and setting the audio and/or video bitrate to the user-preferred bitrate(s). If the device profile 301 of the device capabilities 216(B) indicate that the target device 104 does not support the user preference, the transcode matrix 220 then finds the closest match to the user preference that is within the acceptable range provided by the device profile 301. For example, if a user prefers that all content be transcoded to an audio bitrate of 192 kbps, but the device only supports up to 160 kbps, then the content will be transcoded to 160 kbps. However, if a user selects a higher bitrate than that of a source file, the source file will not be transcoded if it is supported as is on the target device.

Another reason the transcode matrix 220 may determine that a source file 214 needs to be transcoded is if the target device places a restriction on the total bitrate. A device may place a restriction on total bitrate (i.e., the sum of audio bitrate and video bitrate) on a per profile basis. Thus, there can exist a device profile 301 that declares support for an audio bitrate of 0-320000 and a video bitrate of 0-700000. However, the total bitrate may be limited to 800000. Thus, a combination of audio bitrate of 320000 and video bitrate of 700000 is not allowable. The transcode matrix 220 therefore checks device profiles to see if the sum of the audio and video bitrates does not exceed the specified total (if a restriction is specified). If the sum of the audio and video bitrates exceeds a specified total, the device profile is skipped, and the transcode matrix 220 continues to the next device profile. If no profiles are found as a result, the profile with the lowest audio bitrate above a certain threshold (32000) is selected, and the video bitrate is adjusted in order to fit within the total restricted bitrate. The lowest audio bitrate is chosen in order to give preference to video bitrate.

Exemplary Methods

Example methods for determining if a media source file needs to be transcoded for playback on a target playback device and, if so, the proper format needed for transcoding the source file, will now be described with primary reference to the flow diagrams of FIGS. 5-7. The methods apply to the exemplary embodiments discussed above with respect to FIGS. 1-4. While one or more methods are disclosed by means of flow diagrams and text associated with the blocks of the flow diagrams, it is to be understood that the elements of the described methods do not necessarily have to be performed in the order in which they are presented, and that alternative orders may result in similar advantages. Furthermore, the methods are not exclusive and can be performed alone or in combination with one another. The elements of the described methods may be performed by any appropriate means including, for example, by hardware logic blocks on an ASIC or by the execution of processor-readable instructions defined on a processor-readable medium.

A "processor-readable medium," as used herein, can be any means that can contain, or store, instructions for use or execution by a processor. A processor-readable medium can be, without limitation, an electronic, magnetic, optical, electromagnetic or semiconductor system, apparatus or device. More specific examples of a processor-readable medium include, among others, a portable computer diskette (magnetic), a random access memory (RAM) (magnetic), a read-only memory (ROM) (magnetic), an erasable programmable-read-only memory (EPROM or Flash memory), a rewritable compact disc (CD-RW) (optical), and a portable compact disc read-only memory (CDROM) (optical).

At block 502 of method 500, a transcode matrix 220 receives a file path for a media source file 214. A transcode manager 218 sends the transcode matrix a file path for a media source file each time a media source file is stored in a media library and is destined to be transferred to a target playback device 104. The transcode manager generally sends the file path to the transcode matrix and requests that the transcode matrix determine whether the media source file needs to be transcoded for playback on the target playback device, and if so, how the source file should be transcoded.

At block 504, the transcode matrix locates the media source file in the media library according to the file path received from the transcode manager. The transcode manager retrieves parameters for the media source file from the media library as shown at block 506. The transcode manager first tries to access the parameters directly from the media library as shown at block 508. If this attempt fails, the source file itself is inspected, for example, by opening the source file with a Format SDK to retrieve the source file parameters as shown at block 510. Then at block 512, if opening the media source file also fails, the transcode matrix assigns artificial parameters to the media source file.

In addition, as shown at block 514, retrieving source file parameters for the media source file can include accessing a bitrate preference or other user preference for the target device that has been expressed by a user. If a bitrate preference (e.g., audio and/or video bitrate) or other user preferences are provided by a user, they are substituted for corresponding parameters of the media source file as shown at block 516. At block 518, the transcode matrix generates a source profile based on the parameters retrieved as discussed above regarding block 506.

At block 520, device capabilities 216 are retrieved or accessed from the target playback device. This is generally accomplished by the transcode manager 218 querying the target playback device for the device capabilities. Optionally, as shown at block 522, after device capabilities 216(A) are retrieved by transcode manager 218, they can be serialized into XML format and then saved as device capabilities 216(B) in the media library 208 so that the transcode matrix and other applications have access to them. In addition, each component of the device capabilities 216 (i.e., including the profile collection, device profiles, and parameter values) can be serialized by itself, resulting in a combined XML. The Appendix section shown below, provides sample device capabilities and sample serialized device capabilities. The samples in the Appendix provide examples of device capabilities for a particular target playback device 104 and examples of what serialized device capabilities may look like.

In the event the device capabilities do not indicate any restrictions for the target playback device 104, artificial restrictions will be imposed as shown at block 524. For example, where no bitrate or sample rate restrictions are indicated in the device capabilities, a 32-160 kbps (kilobits per second) bitrate and 0-44100 KHz sample rate may be imposed on the target device 104.

Figure 5:
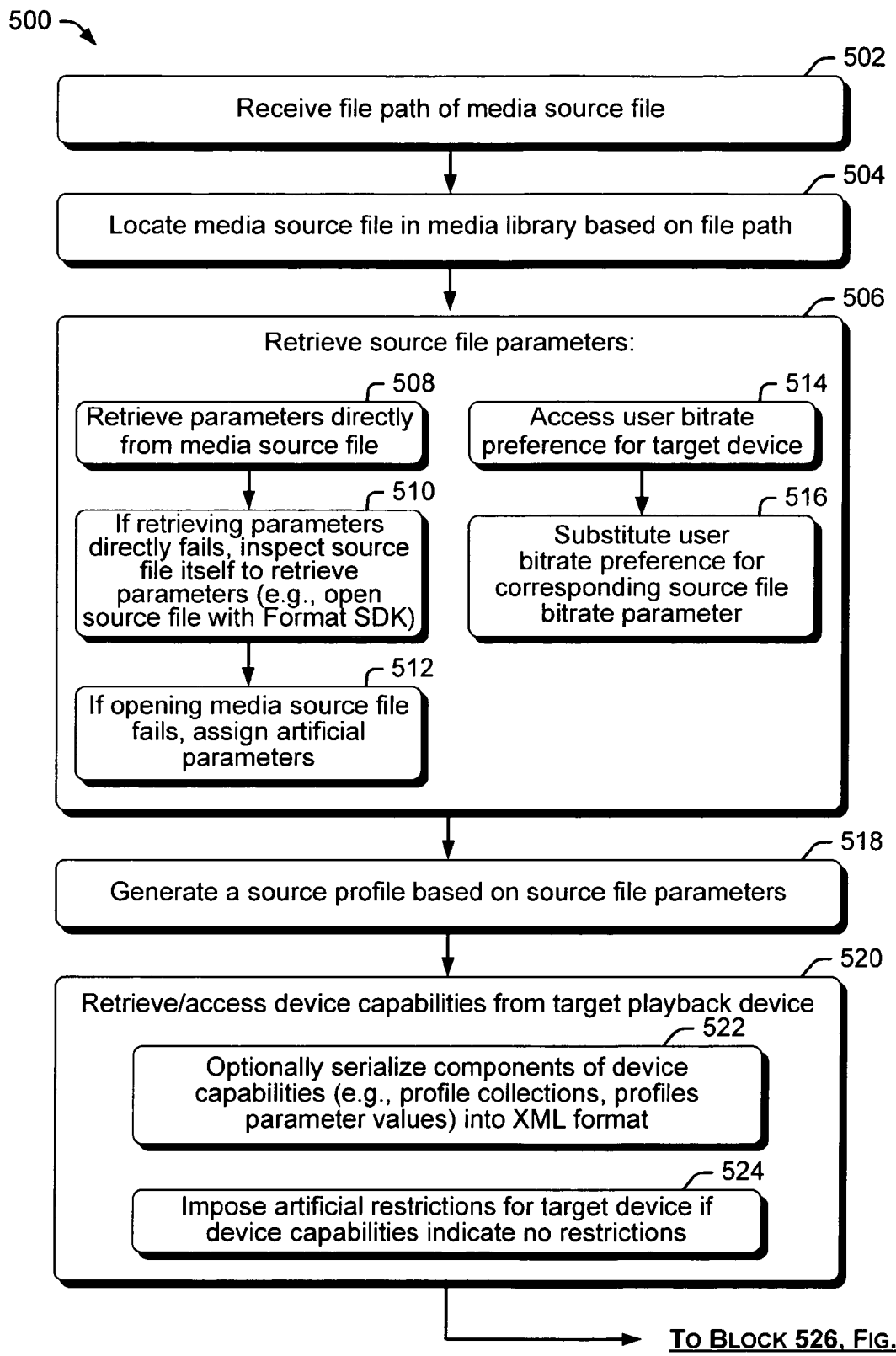
FIGS. 5-7 are a flow diagram illustrating exemplary methods for determining if a media source file needs to be transcoded for playback on a target playback device and, if so, the proper format needed for transcoding the source file. for background transcoding.
Figure 6:
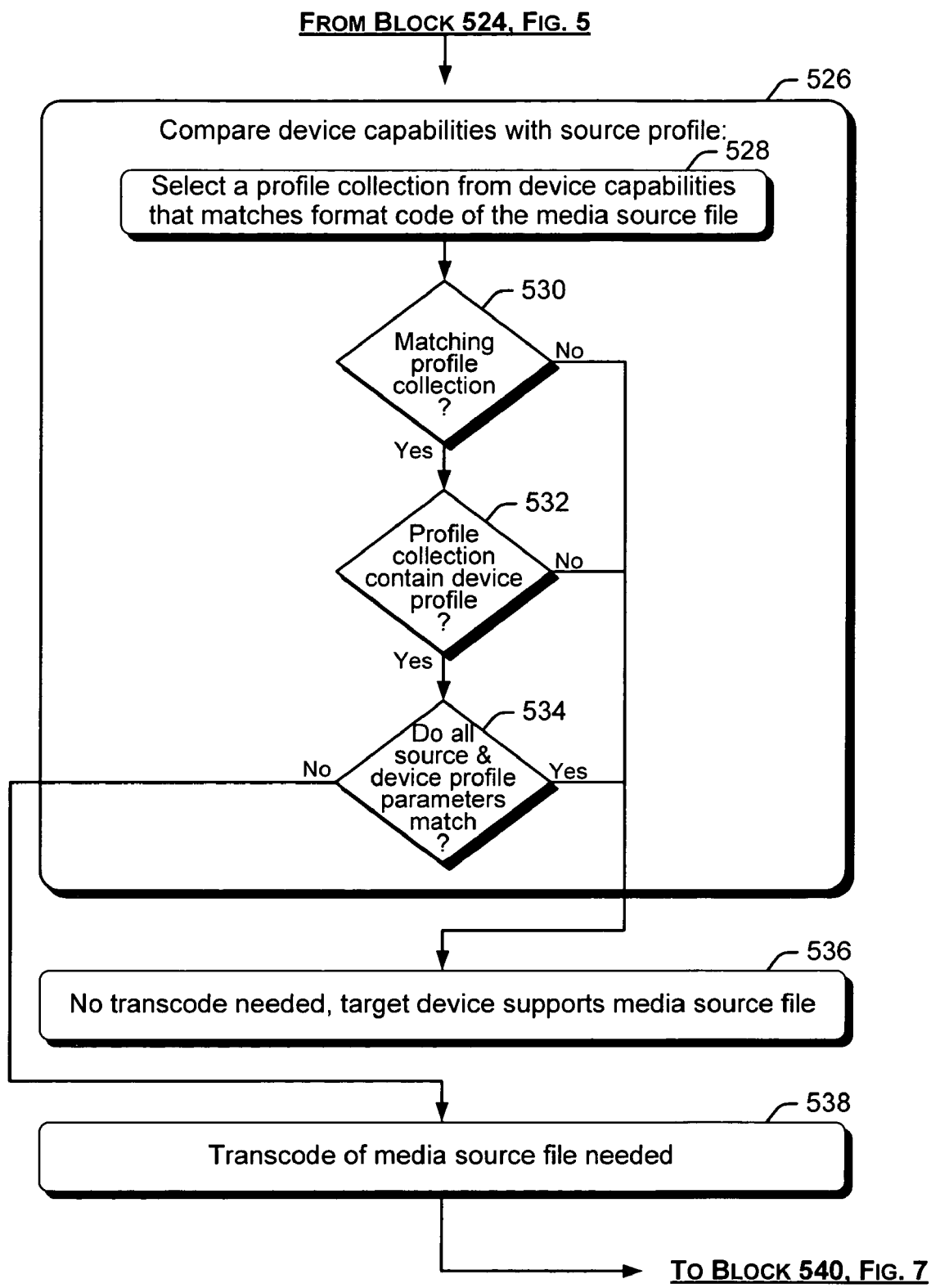

The method 500 continues from FIG. 5 to FIG. 6, at block 526. At block 526, the transcode matrix compares the device capabilities with the source profile. Specifically, the transcode matrix compares parameters in a device profile with like parameters in the source profile. At block 528, a profile collection from the device capabilities is selected that matches the format code of the media source file. At decision block 530, the transcode matrix determines if there are any profile collection in the device capabilities that match the format code of the media source file. If not, the transcode matrix determines that no transcode is needed, because the target device supports the media source file, as shown at block 536. At decision block 530, if the transcode matrix determines that there is a profile collection that matches the format code of the media source file, then the transcode matrix determines if the matching profile collection contains any device profiles (decision block 532). If there are no device profiles in the matching profile collection, the transcode matrix again determines that no transcode is needed and that the target device supports the media source file (block 536). However, if there are one or more device profiles in the matching profile collection, the transcode matrix determines, at decision block 534, if all the parameters in the source profile match (or fall within range of) corresponding parameters in the device profile. If all the parameters in the source profile match (or fall within range of) corresponding parameters in the device profile, then the transcode matrix again determines that no transcode is needed and that the target device supports the media source file (block 536). However, if any of the parameters in the source profile do not match (or fall within range of) corresponding parameters in the device profile, then the transcode matrix determines that the media source file must be transcoded, as shown at block 538.

Figure 7:
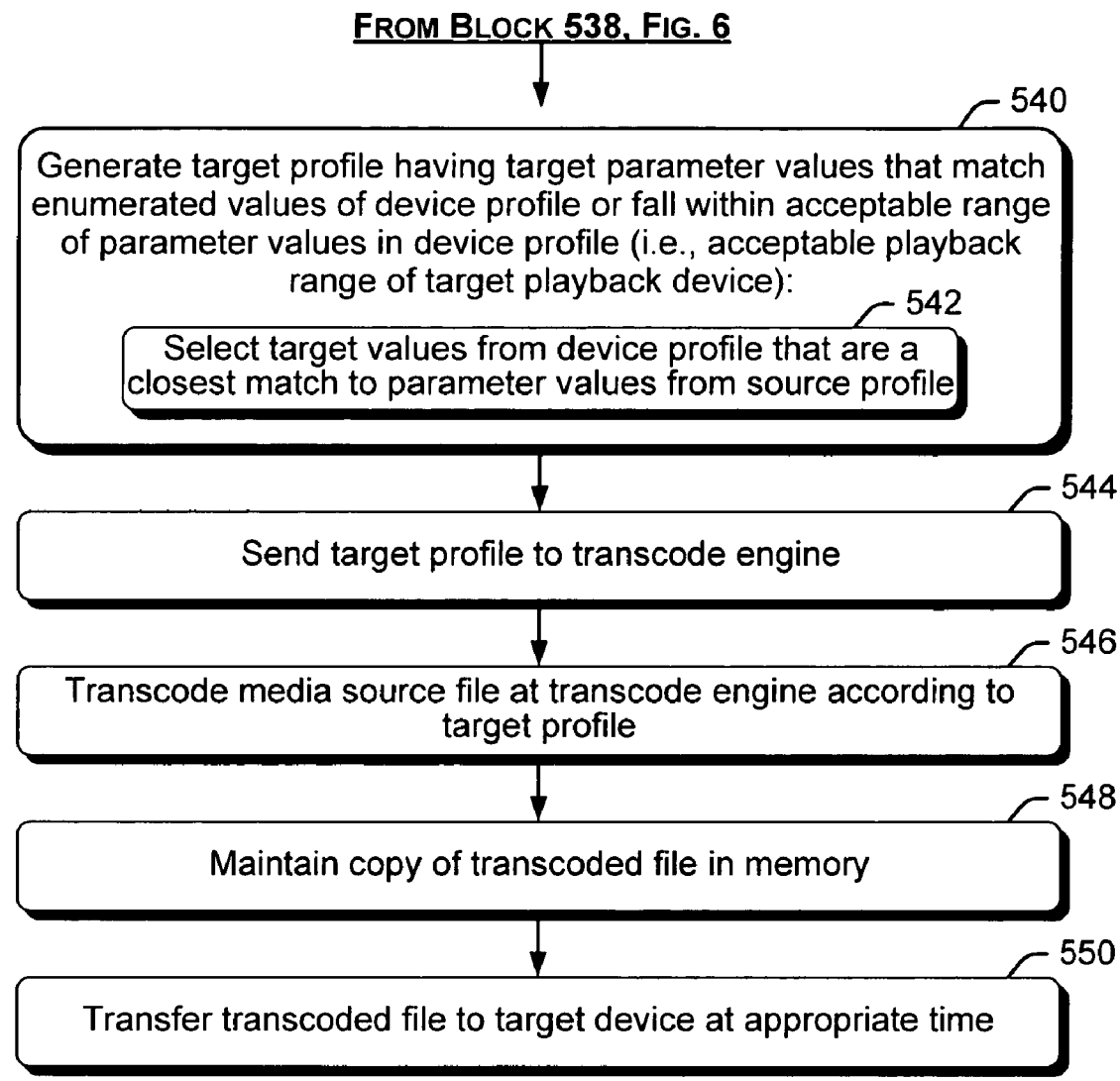

The method 500 continues with block 540 of FIG. 7. At block 540, the transcode matrix generates a target profile 302 that has target parameter values that match enumerated values of the device profile, or that fall within an acceptable range of the corresponding parameters in the device profile. As shown at block 542, when setting target parameter values, the transcode matrix selects target values that fall within acceptable parameter ranges indicated in the device profile, but it selects those target values to be as close to the parameter value of the source profile as possible. Thus, where an acceptable range of values in the device profile is 2-10, for example, and the source profile value is 6, then the selected target profile value will be set at 6 also.

At block 544, the transcode matrix sends the target profile to the transcode engine. At block 546, the transcode engine transcodes the media source file according to target parameter values specified in the target profile received from the transcode matrix. As shown at blocks 548 and 550, respectively, a copy of the transcoded file is then maintained in memory on the source device 102 and transferred to the target playback device at an appropriate time, such as when the target playback device is coupled to the source device for a content synchronization process.

Exemplary Computing Environment

FIG. 8 illustrates an exemplary computing environment for implementing a source computing device 102 suitable for suitable for determining if a media source file needs to be transcoded for playback on a target playback device and, if so, the proper format needed for transcoding the source file, such as discussed above with reference to FIGS. 1-4. Although one specific configuration is shown in FIG. 8, a source computing device 102 may also be implemented in other computing configurations.

The computing environment 800 includes a general-purpose computing system in the form of a computer 802. The components of computer 802 may include, but are not limited to, one or more processors or processing units 804, a system memory 806, and a system bus 808 that couples various system components including the processor 804 to the system memory 806.

The system bus 808 represents one or more of any of several types of bus structures, including a memory bus or memory controller, a peripheral bus, an accelerated graphics port, and a processor or local bus using any of a variety of bus architectures. An example of a system bus 808 would be a Peripheral Component Interconnects (PCI) bus, also known as a Mezzanine bus.

Computer 802 includes a variety of computer-readable media. Such media can be any available media that is accessible by computer 802 and includes both volatile and non-volatile media, removable and non-removable media. The system memory 806 includes computer readable media in the form of volatile memory, such as random access memory (RAM) 810, and/or non-volatile memory, such as read only memory (ROM) 812. A basic input/output system (BIOS) 814, containing the basic routines that help to transfer information between elements within computer 802, such as during start-up, is stored in ROM 812. RAM 810 contains data and/or program modules that are immediately accessible to and/or presently operated on by the processing unit 804.

Computer 802 may also include other removable/non-removable, volatile/non-volatile computer storage media. By way of example, FIG. 8 illustrates a hard disk drive 816 for reading from and writing to a non-removable, non-volatile magnetic media (not shown), a magnetic disk drive 818 for reading from and writing to a removable, non-volatile magnetic disk 820 (e.g., a "floppy disk"), and an optical disk drive 822 for reading from and/or writing to a removable, non-volatile optical disk 824 such as a CD-ROM, DVD-ROM, or other optical media. The hard disk drive 816, magnetic disk drive 818, and optical disk drive 822 are each connected to the system bus 808 by one or more data media interfaces 825. Alternatively, the hard disk drive 816, magnetic disk drive 818, and optical disk drive 822 may be connected to the system bus 808 by a SCSI interface (not shown).

The disk drives and their associated computer-readable media provide non-volatile storage of computer readable instructions, data structures, program modules, and other data for computer 802. Although the example illustrates a hard disk 816, a removable magnetic disk 820, and a removable optical disk 824, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EE- PROM), and the like, can also be utilized to implement the exemplary computing system and environment.

Any number of program modules can be stored on the hard disk 816, magnetic disk 820, optical disk 824, ROM 812, and/or RAM 810, including by way of example, an operating system 826, one or more application programs 828, other program modules 830, and program data 832. Each of such operating system 826, one or more application programs 828, other program modules 830, and program data 832 (or some combination thereof) may include an embodiment of a caching scheme for user network access information.

Computer 802 can include a variety of computer/processor readable media identified as communication media. Communication media embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

A user can enter commands and information into computer system 802 via input devices such as a keyboard 834 and a pointing device 836 (e.g., a "mouse"). Other input devices 838 (not shown specifically) may include a microphone, joystick, game pad, satellite dish, serial port, scanner, and/or the like. These and other input devices are connected to the processing unit 804 via input/output interfaces 840 that are coupled to the system bus 808, but may be connected by other interface and bus structures, such as a parallel port, game port, or a universal serial bus (USB).

A monitor 842 or other type of display device may also be connected to the system bus 808 via an interface, such as a video adapter 844. In addition to the monitor 842, other output peripheral devices may include components such as speakers (not shown) and a printer 846 which can be connected to computer 802 via the input/output interfaces 840.

Computer 802 may operate in a networked environment using logical connections to one or more remote computers, such as a remote computing device 848. By way of example, the remote computing device 848 can be a personal computer, portable computer, a server, a router, a network computer, a peer device or other common network node, and the like. The remote computing device 848 is illustrated as a portable computer that may include many or all of the elements and features described herein relative to computer system 802.

Logical connections between computer 802 and the remote computer 848 are depicted as a local area network (LAN) 850 and a general wide area network (WAN) 852. Such networking environments are commonplace in offices, enterprise-wide computer networks, intranets, and the Internet. When implemented in a LAN networking environment, the computer 802 is connected to a local network 850 via a network interface or adapter 854. When implemented in a WAN networking environment, the computer 802 includes a modem 856 or other means for establishing communications over the wide network 852. The modem 856, which can be internal or external to computer 802, can be connected to the system bus 808 via the input/output interfaces 840 or other appropriate mechanisms. It is to be appreciated that the illustrated network connections are exemplary and that other means of establishing communication link(s) between the computers 802 and 848 can be employed.

In a networked environment, such as that illustrated with computing environment 800, program modules depicted relative to the computer 802, or portions thereof, may be stored in a remote memory storage device. By way of example, remote application programs 858 reside on a memory device of remote computer 848. For purposes of illustration, application programs and other executable program components, such as the operating system, are illustrated herein as discrete blocks, although it is recognized that such programs and components reside at various times in different storage components of the computer system 802, and are executed by the data processor(s) of the computer.

APPENDIX

Sample Device Capabilities

The following samples represent device capabilities returned to a media player application 204 on source device 102 for an example target playback device 104 that supports audio (including WMA Professional Lossless content with high bitrate), video in WMV format, and still pictures in JPG format. The properties returned by actual target playback devices will differ from these device capabilities according to the actual capabilities of such devices.

```
FORMAT: 0x00003009      -- 1 configs
CONFIG: Preference: 1   -- 18 props
ANY                     -- Property: Title
ANY                     -- Property: FileSize
ANY                     -- Property: Duration
ANY                     -- Property: LastModifiedDate
ANY                     -- Property: UserRating
ENUM                    -- Property: NonConsumable    -- 2 values
                        -- Value: 0 0x00000000
                        -- Value: 65535 0x0000FFFF
ANY                     -- Property: FileName
ANY                     -- Property: FormatCode
ANY                     -- Property: Track
ANY                     -- Property: BuyNow
ANY                     -- Property: PersistentUniqueID
ANY                     -- Property: UserEffectiveRating
ANY                     -- Property: PlayCount
ANY                     -- Property: Author
ANY                     -- Property: Genre
RANGE                   -- RangeMin: 8000    -- RangeMax: 48000    -- RangeStep: 50    -- Property: SampleRate
```

-continued

| | | | | |
|---|---|---|---|---|
| RANGE | -- RangeMin: 1 | -- RangeMax: 1500000 | -- RangeStep: 1 | -- Property: Bitrate |
| RANGE | -- RangeMin: 1 | -- RangeMax: 2 | -- RangeStep: 1 | -- Property: NumChannels |
| FORMAT: 0x0000B901 | -- 1 configs | | | |
| CONFIG: Preference: 1 | -- 18 props | | | |
| ANY | -- Property: Title | | | |
| ANY | -- Property: FileSize | | | |
| ANY | -- Property: Duration | | | |
| ANY | -- Property: LastModifiedDate | | | |
| ANY | -- Property: UserRating | | | |
| ENUM | -- Property: NonConsumable | -- 2 values | | |
| | -- Value: 0 0x00000000 | | | |
| | -- Value: 65535 0x0000FFFF | | | |
| ANY | -- Property: FileName | | | |
| ANY | -- Property: FormatCode | | | |
| ANY | -- Property: Track | | | |
| ANY | -- Property: BuyNow | | | |
| ANY | -- Property: PersistentUniqueID | | | |
| ANY | -- Property: UserEffectiveRating | | | |
| ANY | -- Property: PlayCount | | | |
| ANY | -- Property: Author | | | |
| ANY | -- Property: Genre | | | |
| RANGE | -- RangeMin: 8000 | -- RangeMax: 48000 | -- RangeStep: 50 | -- Property: SampleRate |
| RANGE | -- RangeMin: 1 | -- RangeMax: 1500000 | -- RangeStep: 1 | -- Property: Bitrate |
| RANGE | -- RangeMin: 1 | -- RangeMax: 2 | -- RangeStep: 1 | -- Property: NumChannels |
| FORMAT: 0x0000300C | -- 1 configs | | | |
| CONFIG: Preference: 1 | -- 32 props | | | |
| ANY | -- Property: Title | | | |
| ANY | -- Property: FileSize | | | |
| ANY | -- Property: Duration | | | |
| ANY | -- Property: LastModifiedDate | | | |
| ANY | -- Property: UserRating | | | |
| ENUM | -- Property: Nonconsumable | -- 2 values | | |
| | -- Value: 0 0x00000000 | | | |
| | -- Value: 65535 0x0000FFFF | | | |
| RANGE | -- RangeMin: 0 | -- RangeMax: 320 | -- RangeStep: 1 | -- Property: Width |
| ANY | -- Property: FileName | | | |
| ANY | -- Property: FormatCode | | | |
| ANY | -- Property: ProviderCopyright | | | |
| ANY | -- Property: PersistentUniqueID | | | |
| ENUM | -- Property: ScanType | -- 1 values | | |
| | -- Value: 1 0x00000001 | | | |
| ANY | -- Property: UserEffectiveRating | | | |
| RANGE | -- RangeMin: 28000 | -- RangeMax: 800000 | -- RangeStep: 1 | -- Property: TotalBitrate |
| ANY | -- Property: PlayCount | | | |
| RANGE | -- RangeMin: 0 | -- RangeMax: 240 | -- RangeStep: 1 | -- Property: Height |
| ANY | -- Property: Description | | | |
| ANY | -- Property: FileCreationdate | | | |
| ANY | -- Property: Genre | | | |
| ENUM | -- Property: KeyFrameDistance | -- 1 values | | |
| | -- Value: 3 0x00000003 | | | |
| ANY | -- Property: SubTitleDescription | | | |
| ANY | -- Property: SubTitle | | | |
| RANGE | -- RangeMin: 1 | -- RangeMax: 2 | -- RangeStep: 1 | -- Property: NumChannels |
| ANY | -- Property: ParentalRating | | | |
| RANGE | -- RangeMin: 1 | -- RangeMax: 320000 | -- RangeStep: 1 | -- Property: Bitrate |
| ENUM | -- Property: AudioWAVECodec | -- 1 values | | |
| | -- Value: 353 0x00000161 | | | |
| ENUM | -- Property: BufferSize | -- 1 values | | |
| | -- Value: 3 0x00000003 | | | |
| RANGE | -- RangeMin: 15000 | -- RangeMax: 30000 | -- RangeStep: 1 | -- Property: FrameRate |
| ENUM | -- Property: QualitySetting | -- 1 values | | |
| | -- Value: 50 0x00000032 | | | |
| RANGE | -- RangeMin: 8000 | -- RangeMax: 48000 | -- RangeStep: 50 | -- Property: SampleRate |
| ENUM | -- Property: VideoFourCCCodec | -- 4 values | | |
| | -- Value: 827739479 0x31564D57 | | | |
| | -- Value: 844516695 0x32564D57 | | | |
| | -- Value: 861293911 0x33564D57 | | | |
| | -- Value: 1347833175 0x50564D57 | | | |
| RANGE | -- RangeMin: 28000 | -- RangeMax: 736000 | -- RangeStep: 1 | -- Property: VideoBitrate |
| FORMAT: 0x0000B981 | -- 1 configs | | | |
| CONFIG: Preference: 1 | -- 32 props | | | |
| ANY | -- Property: Title | | | |
| ANY | -- Property: FileSize | | | |
| ANY | -- Property: Duration | | | |
| ANY | -- Property: LastModifiedDate | | | |
| ANY | -- Property: UserRating | | | |
| ENUM | -- Property: NonConsumable | -- 2 values | | |
| | -- Value: 0 0x00000000 | | | |
| | -- Value: 65535 0x0000FFFF | | | |

| | | | | |
|---|---|---|---|---|
| RANGE | -- RangeMin: 0 | -- RangeMax: 320 | -- RangeStep: 1 | -- Property: Width |
| ANY | -- Property: FileName | | | |
| ANY | -- Property: FormatCode | | | |
| ANY | -- Property: ProviderCopyright | | | |
| ANY | -- Property: PersistentUniqueID | | | |
| ENUM | -- Property: ScanType | -- 1 values | | |
| | -- Value: 1 0x00000001 | | | |
| ANY | -- Property: UserEffectiveRating | | | |
| RANGE | -- RangeMin: 28000 | -- RangeMax: 800000 | -- RangeStep: 1 | -- Property: TotalBitrate |
| ANY | -- Property: PlayCount | | | |
| RANGE | -- RangeMin: 0 | -- RangeMax: 240 | -- RangeStep: 1 | -- Property: Height |
| ANY | -- Property: Description | | | |
| ANY | -- Property: FileCreationDate | | | |
| ANY | -- Property: Genre | | | |
| ENUM | -- Property: KeyFrameDistance | -- 1 values | | |
| | -- Value: 3 0x00000003 | | | |
| ANY | -- Property: SubTitleDescription | | | |
| ANY | -- Property: SubTitle | | | |
| RANGE | -- RangeMin: 1 | -- RangeMax: 2 | -- RangeStep: 1 | -- Property: NumChannels |
| ANY | -- Property: ParentalRating | | | |
| RANGE | -- RangeMin: 1 | -- RangeMax: 320000 | -- RangeStep: 1 | -- Property: Bitrate |
| ENUM | -- Property: AudioWAVECodec | -- 1 values | | |
| | -- Value: 353 0x00000161 | | | |
| ENUM | -- Property: BufferSize | -- 1 values | | |
| | -- Value: 3 0x00000003 | | | |
| RANGE | -- RangeMin: 15000 | -- RangeMax: 30000 | -- RangeStep: 1 | -- Property: FrameRate |
| ENUM | -- Property: QualitySetting | -- 1 values | | |
| | -- Value: 50 0x00000032 | | | |
| RANGE | -- RangeMin: 8000 | -- RangeMax: 48000 | -- RangeStep: 50 | -- Property: SampleRate |
| ENUM | -- Property: VideoFourCCCodec | -- 4 values | | |
| | -- Value: 827739479 0x31564D57 | | | |
| | -- Value: 844516695 0x32564D57 | | | |
| | -- Value: 861293911 0x33564D57 | | | |
| | -- Value: 1347833175 0x50564D57 | | | |
| RANGE | -- RangeMin: 28000 | -- RangeMax: 736000 | -- RangeStep: 1 | -- Property: VideoBitrate |
| FORMAT: 0x00003801 | -- 1 configs | | | |
| CONFIG: Preference: 1 | -- 14 props | | | |
| ANY | -- Property: Title | | | |
| ANY | -- Property: FileSize | | | |
| ANY | -- Property: LastModifiedDate | | | |
| ANY | -- Property: UserRating | | | |
| ENUM | -- Property: NonConsumable | -- 2 values | | |
| | -- Value: 0 0x00000000 | | | |
| | -- Value: 65535 0x0000FFFF | | | |
| RANGE | -- RangeMin: 0 | -- RangeMax: 320 | -- RangeStep: 1 | -- Property: Width |
| ANY | -- Property: AuthorDate | | | |
| ANY | -- Property: FileName | | | |
| ANY | -- Property: FormatCode | | | |
| ANY | -- Property: PersistentUniqueID | | | |
| ANY | -- Property: UserEffectiveRating | | | |
| ANY | -- Property: PlayCount | | | |
| RANGE | -- RangeMin: 0 | -- RangeMax: 240 | -- RangeStep: 1 | -- Property: Height |
| ANY | -- Property: FileCreationDate | | | |
| FORMAT: 0x00003001 | -- 1 configs | | | |
| CONFIG: Preference: 1 | -- 7 props | | | |
| ANY | -- Property: Title | | | |
| ANY | -- Property: FileSize | | | |
| ANY | -- Property: LastModifiedDate | | | |
| ENUM | -- Property: NonConsumable | -- 2 values | | |
| | -- Value: 0 0x00000000 | | | |
| | -- Value: 65535 0x0000FFFF | | | |
| ANY | -- Property: FileName | | | |
| ANY | -- Property: FormatCode | | | |
| ANY | -- Property: PersistentUniqueID | | | |
| FORMAT: 0x0000BA03 | -- 1 configs | | | |
| CONFIG: Preference: 1 | -- 13 props | | | |
| RANGE | -- RangeMin: 0 | -- RangeMax: 320 | -- RangeStep: 1 | -- Property: AlbumCoverWidth |
| ANY | -- Property: Title | | | |
| ANY | -- Property: FileSize | | | |
| ANY | -- Property: LastModifiedDate | | | |
| ENUM | -- Property: NonConsumable | -- 2 values | | |
| | -- Value: 0 0x00000000 | | | |
| | -- Value: 65535 0x0000FFFF | | | |
| ANY | -- Property: FileName | | | |
| ANY | -- Property: FormatCode | | | |
| ENUM | -- Property: AlbumCoverFormat | -- 1 values | | |
| | -- Value: 14337 0x00003801 | | | |
| ANY | -- Property: PersistentUniqueID | | | |
| RANGE | -- RangeMin: 0 | -- RangeMax: 240 | -- RangeStep: 1 | -- Property: AlbumCoverHeight |

| | | |
|---|---|---|
| ANY | -- Property: AlbumCoverData | |
| ANY | -- Property: Author | |
| ANY | -- Property: Genre | |
| FORMAT: 0x0000BA05 | -- 1 configs | |
| CONFIG: Preference: 1 | -- 7 props | |
| ANY | -- Property: Title | |
| ANY | -- Property: FileSize | |
| ANY | -- Property: LastModifiedDate | |
| ENUM | -- Property: NonConsumable | -- 2 values |
| | -- Value: 0 0x00000000 | |
| | -- Value: 65535 0x0000FFFF | |
| ANY | -- Property: FileName | |
| ANY | -- Property: FormatCode | |
| ANY | -- Property: PersistentUniqueID | |
| FORMAT: 0x00003000 | -- 1 configs | |
| CONFIG: Preference: 1 | -- 7 props | |
| ANY | -- Property: Title | |
| ANY | -- Property: FileSize | |
| ANY | -- Property: LastModifiedDate | |
| ENUM | -- Property: NonConsumable | -- 2 values |
| | -- Value: 0 0x00000000 | |
| | -- Value: 65535 0x0000FFFF | |
| ANY | -- Property: FileName | |
| ANY | -- Property: FormatCode | |
| ANY | -- Property: PersistentUniqueID | |
| FORMAT: 0x0000B802 | -- 1 configs | |
| CONFIG: Preference: 1 | -- 7 props | |
| ANY | -- Property: Title | |
| ANY | -- Property: FileSize | |
| ANY | -- Property: LastModifiedDate | |
| ENUM | -- Property: NonConsumable | -- 2 values |
| | -- Value: 0 0x00000000 | |
| | -- Value: 65535 0x0000FFFF | |
| ANY | -- Property: FileName | |
| ANY | -- Property: FormatCode | |
| ANY | -- Property: PersistentUniqueID | |

Sample Serialized Device Capabilities

The following samples are based on the above sample device capabilities, serialized to XML (i.e., what is saved in the media library 208 after stripping off the irrelevant content).

```
<DeviceCaps>
    <ProfileCollection FormatCode="12297">
        <Profile>
            <ParameterValue Name="Bitrate">
                <Range Minimum="1" Maximum="1500000"
                Step="1"/>
            </ParameterValue>
            <ParameterValue Name="NumChannels">
                <Range Minimum="1" Maximum="2"
                Step="1"/>
            </ParameterValue>
            <ParameterValue Name="SampleRate">
                <Range Minimum="8000" Maximum="48000"
                Step="50"/>
            </ParameterValue>
        </Profile>
    </ProfileCollection>
    <ProfileCollection FormatCode="47361">
        <Profile>
            <ParameterValue Name="Bitrate">
                <Range Minimum="1" Maximum="1500000"
                Step="1"/>
            </ParameterValue>
            <ParameterValue Name="NumChannels">
                <Range Minimum="1" Maximum="2"
                Step="1"/>
            </ParameterValue>
            <ParameterValue Name="SampleRate">
                <Range Minimum="8000" Maximum="48000"
```

-continued

```
                Step="50"/>
            </ParameterValue>
        </Profile>
    </ProfileCollection>
    <ProfileCollection FormatCode="12300">
        <Profile>
            <ParameterValue Name="AudioWAVECodec">
                <Enum>
                    <Value>353</Value>
                </Enum>
            </ParameterValue>
            <ParameterValue Name="Bitrate">
                <Range Minimum="1" Maximum="320000"
                Step="1"/>
            </ParameterValue>
            <ParameterValue Name="BufferSize">
                <Enum>
                    <Value>3</Value>
                </Enum>
            </ParameterValue>
            <ParameterValue Name="FrameRate">
                <Range Minimum="15000" Maximum=" 30000"
                Step="1"/>
            </ParameterValue>
            <ParameterValue Name="Height">
                <Range Minimum="0" Maximum="240"
                Step="1"/>
            </ParameterValue>
            <ParameterValue Name="KeyFrameDistance">
                <Enum>
                    <Value>3</Value>
                </Enum>
            </ParameterValue>
            <ParameterValue Name="NumChannels">
                <Range Minimum="1" Maximum="2"
                Step="1"/>
```

```xml
        </ParameterValue>
        <ParameterValue Name="QualitySetting">
            <Enum>
                <Value>50</Value>
            </Enum>
        </ParameterValue>
        <ParameterValue Name="SampleRate">
            <Range Minimum="8000" Maximum="48000" Step="50"/>
        </ParameterValue>
        <ParameterValue Name="ScanType">
            <Enum>
                <Value>1</Value>
            </Enum>
        </ParameterValue>
        <ParameterValue Name="TotalBitrate">
            <Range Minimum="28000" Maximum="800000" Step="1"/>
        </ParameterValue>
        <ParameterValue Name="VideoBitrate">
            <Range Minimum="28000" Maximum="736000" Step="1"/>
        </ParameterValue>
        <ParameterValue Name="VideoFourCCCodec">
            <Enum>
                <Value>827739479</Value>
                <Value>844516695</Value>
                <Value>861293911</Value>
                <Value>1347833175</Value>
            </Enum>
        </ParameterValue>
        <ParameterValue Name="Width">
            <Range Minimum="0" Maximum="320" Step="1"/>
        </ParameterValue>
    </Profile>
</ProfileCollection>
<ProfileCollection FormatCode="47489">
    <Profile>
        <ParameterValue Name="DeviceConformanceTemplate">
            <Enum>
                <Value>5242963</Value>
            </Enum>
        </ParameterValue>
        <ParameterValue Name="AudioWAVECodec">
            <Enum>
                <Value>353</Value>
            </Enum>
        </ParameterValue>
        <ParameterValue Name="Bitrate">
            <Range Mimimum="1" Maximum="320000" Step="1"/>
        </ParameterValue>
        <ParameterValue Name="BufferSize">
            <Enum>
                <Value>3</Value>
            </Enum>
        </ParameterValue>
        <ParameterValue Name="FrameRate">
            <Range Minimum="15000" Maximum="30000" Step="1"/>
        </ParameterValue>
        <ParameterValue Name="Height">
            <Range Mimimum="0" Maximum="240" Step="1"/>
        </ParameterValue>
        <ParameterValue Name="KeyFrameDistance">
            <Enum>
                <Value>3</Value>
            </Enum>
        </ParameterValue>
        <ParameterValue Name="NumChannels">
            <Range Minimum="1" Maximum="2" Step="1"/>
        </ParameterValue>
        <ParameterValue Name="QualitySetting">
            <Enum>
                <Value>50</Value>
            </Enum>
        </ParameterValue>
        <ParameterValue Name="SampleRate">
            <Range Minimum="8000" Maximum="48000" Step="50"/>
        </ParameterValue>
        <ParameterValue Name="ScanType">
            <Enum>
                <Value>1</Value>
            </Enum>
        </ParameterValue>
        <ParameterValue Name="TotalBitrate">
            <Range Minimum="28000" Maximum="800000" Step="1"/>
        </ParameterValue>
        <ParameterValue Name="VideoBitrate">
            <Range Minimum="28000" Maximum="736000" Step="1"/>
        </ParameterValue>
        <ParameterValue Name="VideoFourCCCodec">
            <Enum>
                <Value>827739479</Value>
                <Value>844516695</Value>
                <Value>861293911</Value>
                <Value>1347833175</Value>
            </Enum>
        </ParameterValue>
        <ParameterValue Name="Width">
            <Range Minimum="0" Maximum="320" Step="1"/>
        </ParameterValue>
    </Profile>
</ProfileCollection>
<ProfileCollection FormatCode="14337">
    <Profile>
        <ParameterValue Name="Height">
            <Range Minimum="0" Maximum="240" Step="1"/>
        </ParameterValue>
        <ParameterValue Name="Width">
            <Range Minimum="0" Maximum="320" Step="1"/>
        </ParameterValue>
    </Profile>
</ProfileCollection>
<ProfileCollection FormatCode="12289">
    <Profile/>
</ProfileCollection>
<ProfileCollection FormatCode="47619">
    <Profile>
        <ParameterValue Name="AlbumCoverFormat">
            <Enum>
                <Value>14337</Value>
            </Enum>
        </ParameterValue>
        <ParameterValue Name="AlbumCoverHeight">
            <Range Minimum="0" Maximum="240" Step="1"/>
        </ParameterValue>
        <ParameterValue Name="AlbumCoverWidth">
            <Range Minimum="0" Maximum="320" Step="1"/>
        </ParameterValue>
    </Profile>
</ProfileCollection>
<ProfileCollection FormatCode="47621">
    <Profile/>
</ProfileCollection>
<ProfileCollection FormatCode="12288">
    <Profile/>
</ProfileCollection>
<ProfileCollection FormatCode="47106">
    <Profile/>
</ProfileCollection>
</DeviceCaps>
```

CONCLUSION

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

The invention claimed is:

1. A system comprising:
   one or more processors;
   a media source file;
   device capabilities from a target playback device; and
   a transcode matrix accessible to the one or more processors and configured to:
   generate a source profile from the media source file;
   determine that the target device can support the media source file based on a comparison of the source profile with the device capabilities, wherein the transcode matrix determines that the target device supports the media source file by determining that a total bitrate restriction is specified for an audio bitrate and a video bitrate of one or more device profiles of the target playback device and by selecting a particular device profile with a lowest audio bitrate above a certain threshold when a total of the audio bitrate and the video bitrate of the media source file is above the total bitrate restriction of each of the one or more device profiles;
   determine that the media source file needs to be transcoded based on a user-preferred bitrate of a particular parameter; and
   transcode the media source file according to a maximum bitrate of the particular parameter supported by the target device as indicated by the device capabilities when the target device does not support the user-preferred bitrate of the particular parameter.

2. A method comprising:
   generating a source profile from a media source file by a source device, the source device configured to determine transcoding requirements of source files for playback on target devices;
   determining, by the source device, that the target device can support the media source file based on a comparison of the source profile with capabilities of a target device, wherein determining that the target device supports the media source file includes determining that a total bitrate restriction is specified for an audio bitrate and a video bitrate of one or more device profiles of the target playback device and by selecting a particular device profile with a lowest audio bitrate above a certain threshold when a total of the audio bitrate and the video bitrate of the media source file is above the total bitrate restriction of each of the one or more device profiles;
   determining, by the source device, that the media source file needs to be transcoded based on a user-preferred bitrate of a particular parameter; and
   transcoding, by the source device, the media source file according to a maximum bitrate of the particular parameter supported by the target device as indicated by the device capabilities when the target device does not support the user-preferred bitrate of the particular parameter.

3. The method of claim 2, further comprising:
   monitoring media content of a media library of the source device to identify newly acquired media source files; and
   storing a newly acquired media source file at the media library of the source device.

4. The method of claim 3, further comprising:
   determining, by the source device, if the newly acquired media source file is destined to be transferred to the target device;
   accessing the newly acquired media source file by the source device when the source file is destined to be transferred to the target device;
   accessing, by the source device, the capabilities of the target device; and
   determining, by the source device, if the newly acquired media source file needs to be transcoded.

5. The method of claim 2, further comprising:
   determining, by the source device, that the media source file needs to be transcoded based on the comparison of the source profile with the capabilities of the target device; and
   generating, by the source device, a target profile having target parameter values that fall within the capabilities of the target device, wherein the target parameter values either match a device capability parameter or fall within a playback range of a device capability parameter.

6. The method of claim 2, wherein the comparison of the source profile with capabilities of the target device comprises:
   selecting, by the source device, a profile collection from the capabilities of the target device whose format code matches the source profile;
   if there is no profile collection whose format code matches the source profile, determining, by the source device, that the source profile is not supported by the target device;
   if the profile collection contains no device profiles, determining, by the source device, that the source profile is supported with no restrictions by the target device; and
   for each device profile in the profile collection, determining, by the source device, if each respective parameter in the source profile either matches an enumerated value specified for the respective parameter in the device profile or falls into a range specified for the respective parameter in the device profile.

7. The method of claim 6, wherein each respective parameter in the source profile either matches the enumerated value specified for the respective parameter in the one or more device profiles or falls into the range specified for the respective parameter in the one or more device profiles, and further comprising determining, by the source device, that the media source file does not need to be transcoded when the target device supports the media source file.

8. The method of claim 6, wherein the respective parameter in the media source file is a non-matching parameter that either does not match the enumerated value specified for the respective parameter in the device profile or does not fall into the range specified for the respective parameter in the one or more device profiles, and further comprising determining, by the source device, that the media source file needs to be transcoded when the target device does not support the media source file.

9. The method of claim 8, further comprising generating, by the source device, a target profile having target parameter values that fall within the capabilities of the target device indicated by the one or more device profiles.

10. The method of claim 9, wherein generating the target profile comprises determining, by the source device, a target value for the non-matching parameter value that falls within the capabilities of the target device indicated by the one or more device profiles.

11. The method of claim 10, wherein determining the target value comprises selecting by the source device, a target value from within the one or more device profiles that is a closest match to the non-matching parameter in the source profile.

12. The method of claim 2, wherein the capabilities of the target device indicate no restrictions for the target device, the method further comprising:
- imposing artificial restrictions on the target device by the source device; and
- comparing the artificial restrictions with the source profile.

13. The method of claim 5, further comprising:
- sending the target profile to a transcode engine of the source device;
- transcoding, by the source device, the media source file with the transcode engine according to the target parameter values in the target profile;
- transferring the transcoded source file to the target device from the source device; and
- maintaining a copy of the transcoded source file in memory of the source device.

14. One or more processor-readable storage media of a source device, the one or more processor-readable storage media comprising processor-executable instructions configured to perform acts comprising:
- generating a source profile from a media source file; determining that the target device can support the media source file based on a comparison of the source profile with capabilities of a target device, wherein determining that the target device supports the media source file includes determining that a total bitrate restriction is specified for an audio bitrate and a video bitrate of one or more device profiles of the target playback device and by selecting a particular device profile with a lowest audio bitrate above a certain threshold when a total of the audio bitrate and the video bitrate of the media source file is above the total bitrate restriction of each of the one or more device profiles; determining that the media source file needs to be transcoded based on a user-preferred bitrate of a particular parameter; and transcoding the media source file according to a maximum bitrate of the particular parameter supported by the target device as indicated by the device capabilities when the target device does not support the user-preferred bitrate of the particular parameter.

15. The one or more processor-readable storage media of claim 14, wherein the acts further comprise:
- retrieving a device capabilities report from the target device, wherein the device capabilities report includes a plurality of device profiles specifying capabilities of the target device;
- identifying a particular device profile of the plurality of device profiles that best matches the source profile;
- comparing the source profile with the particular device profile to determine whether the media source file needs to be transcoded to enable playback of the media source file on the target device.

16. The one or more processor-readable storage media of claim 14, wherein generating the source profile comprises:
- receiving a file path to the media source file;
- locating the media source file in a media library according to the file path; and
- obtaining parameters from the media source file.

17. The one or more processor-readable storage media of claim 15, wherein the acts further comprise:
- serializing the device capabilities report; and
- selecting from the serialized device capabilities, a profile collection that matches a format code of the media source file,
- the profile collection having a collection of profiles that are all of the same format code, wherein the plurality of device profiles includes the collection of profiles.

18. The one or more processor-readable storage media of claim 15, wherein the comparison of the source profile with capabilities of the target device comprises:
- searching for a profile collection in the device capabilities report that matches a format code of the media source file;
- and if no profile collection is found that matches the format code of the media source file, determining that the target device does not support the source profile and that the media source file does not need to be transcoded.

19. One or more processor-readable storage media as recited in claim 15, wherein the comparison of the source profile with capabilities of the target device comprises:
- finding a profile collection in the device capabilities report that matches a format code of the media source file;
- determining that the profile collection contains no profiles; and
- determining that the target playback device supports the source profile with no restrictions and that the media source file does not need to be transcoded.

20. One or more processor-readable storage media as recited in claim 15, wherein the comparison of the source profile with capabilities of the target device comprises:
- finding a profile collection in the device capabilities report that matches a format code of the media source file, wherein the particular device profile is included in the profile collection; and
- comparing parameters from the source profile with like parameters from the particular device profile.

* * * * *

UNITED STATES PATENT AND TRADEMARK OFFICE
CERTIFICATE OF CORRECTION

| | | |
|---|---|---|
| PATENT NO. | : 7,669,121 B2 | Page 1 of 1 |
| APPLICATION NO. | : 11/039252 | |
| DATED | : February 23, 2010 | |
| INVENTOR(S) | : Dennis A. Kiilerich | |

It is certified that error appears in the above-identified patent and that said Letters Patent is hereby corrected as shown below:

In column 10, line 14, delete "contain, or store," and insert -- contain or store --, therefor.

Signed and Sealed this
Eighth Day of February, 2011

David J. Kappos
*Director of the United States Patent and Trademark Office*